US010229125B2

(12) United States Patent
Goodman et al.

(10) Patent No.: US 10,229,125 B2
(45) Date of Patent: *Mar. 12, 2019

(54) REMOTE DATA PROTECTION IN A NETWORKED STORAGE COMPUTING ENVIRONMENT

(71) Applicant: International Business Machines Corporation, Armonk, NY (US)

(72) Inventors: David P. Goodman, Longmont, CO (US); Sandeep Gopisetty, Morgan Hill, CA (US); Shripad Nadgowda, Nagpur (IN); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,010

(22) Filed: Nov. 15, 2016

(65) Prior Publication Data

US 2017/0060884 A1 Mar. 2, 2017

Related U.S. Application Data

(63) Continuation of application No. 14/167,345, filed on Jan. 29, 2014, now Pat. No. 9,575,848, which is a continuation of application No. 13/023,240, filed on Feb. 8, 2011, now Pat. No. 8,676,763.

(51) Int. Cl.
*G06F 17/30* (2006.01)
*G06F 11/14* (2006.01)

(52) U.S. Cl.
CPC .... *G06F 17/30082* (2013.01); *G06F 11/1451* (2013.01); *G06F 11/1461* (2013.01); *G06F 11/1464* (2013.01); *G06F 11/1469* (2013.01); *G06F 17/302* (2013.01); *G06F 17/30088* (2013.01); *G06F 17/30575* (2013.01)

(58) Field of Classification Search
None
See application file for complete search history.

(56) References Cited

U.S. PATENT DOCUMENTS

| 6,895,413 | B2 | 5/2005 | Edwards |
| 7,290,102 | B2 | 10/2007 | Lubbers et al. |
| 7,636,764 | B1 | 12/2009 | Fein et al. |
| 7,765,187 | B2 | 7/2010 | Bergant et al. |
| 7,840,595 | B1 | 11/2010 | Blitzer et al. |
| 8,676,763 | B2 | 3/2014 | Goodman et al. |

(Continued)

*Primary Examiner* — Jau Shya Meng
(74) *Attorney, Agent, or Firm* — Stephen R. Yoder

(57) ABSTRACT

Protecting and restoring data within a networked (e.g. cloud) storage computing environment through asynchronous replication and remote backup of data and its associated metadata. Data backup and recovery functionality provides data backups by detecting incremental updates to the data and its associated metadata at specific points in time determined by policies. The policies are configurable based on user requirements. Multiple copies of the data backups can be made and stored in separate compressed files at backup/disaster recovery locations. The backups of data and its associated metadata, which includes file system configuration information can be used to restore the state of a computer file system to that of a given point-in-time. Accordingly, a data protection approach is disclosed for protecting data at both the file system level and application level.

18 Claims, 10 Drawing Sheets

(56) References Cited

U.S. PATENT DOCUMENTS

| | | |
|---|---|---|
| 2001/0056503 A1 | 12/2001 | Hibbard |
| 2003/0229656 A1 | 12/2003 | Hitz et al. |
| 2005/0080823 A1 | 4/2005 | Collins |
| 2005/0102547 A1 | 5/2005 | Keeton et al. |
| 2006/0235907 A1 | 10/2006 | Kathuria et al. |
| 2009/0157990 A1 | 6/2009 | Yamada et al. |
| 2010/0161759 A1 | 6/2010 | Brand |
| 2010/0199042 A1 | 8/2010 | Bates et al. |
| 2010/0257142 A1 | 10/2010 | Murphy et al. |
| 2011/0016089 A1 | 1/2011 | Freedman et al. |
| 2011/0113404 A1 | 5/2011 | Kim |
| 2011/0184912 A1 | 7/2011 | Baptist et al. |
| 2014/0149791 A1 | 5/2014 | Goodman et al. |

REMOTE DATA PROTECTION IN A NETWORKED STORAGE COMPUTING ENVIRONMENT

TECHNICAL FIELD

The present invention generally relates to networked storage computing. Specifically, the present invention relates to providing remote data protection for a general parallel file system based networked (e.g. cloud) storage computing environment, through asynchronous coordinated data and metadata replication.

BACKGROUND

The cloud computing environment is an enhancement to the predecessor grid environment, whereby multiple grids and other computation resources may be further abstracted by a cloud layer, thus making disparate devices appear to an end-user/consumer as a single pool of seamless resources that are highly scalable. These resources may include such things as physical or logical compute engines, servers and devices, device memory, storage devices, etc.

Computer hardware and software applications are often critical to the efficient operations of companies, as well as the stability of the world economy as a whole. Many of today's businesses require 24/7 availability for critical applications and downtime of such critical applications can quickly decrease revenue. As a result, companies have to prepare for unplanned computer system outages that may shut down their business operations. Unplanned outages can be caused by, among other things, someone gaining unauthorized access to a business's computer systems, computer hardware failure, natural disasters, or even a disaster caused by human error or malicious intent. To prepare for unplanned computer system outages, companies create disaster recovery plans, which are utilized to provide for continuity and/or restoration of computer systems that are critical for business operations. Preparation of disaster recovery plans has expanded as businesses have come to realize the extent of their dependency on computer systems and applications.

Moreover, companies have to prepare for planned outages such as test deployments for scheduled software application version upgrades, or for scheduled maintenance of computer hardware systems and components. Generally, companies announce to customers and employees when a planned outage will occur, such as a software application version upgrade. Upgrades may take more time than expected and occasionally, can even cause more unforeseen problems than an unplanned outage if loss or corruption of data and/or applications occurs.

Accordingly, companies typically need their production environment to be ready for software application installation/upgrade testing, and/or "mock" disaster recovery scenario testing. For example, a company may be running a computer software version 1.0 in a first production environment and wants to upgrade the first production environment to computer software version 1.1. Therefore, the company may need a remote second production environment that runs in parallel to the first production environment, which utilizes a set of the first production environment's data. One purpose of the remote second production environment would be to test a computer software version 1.1 upgrade, prior to deployment of the version 1.1 upgrade to the first production environment.

Furthermore, a company may also desire, for remote data protection purposes, to use the remote second production environment as a "hot backup" location, and perform testing so as to ensure the company can switch back and forth between the first production environment and the remote second production environment in case a computer system outage occurs.

SUMMARY

Aspects of the present invention provide a method, a computer program product, and a system that include: recording data and associated metadata at specific points-in-time based on policies that enforce both a recovery point objective (RPO) that defines a maximum time period in which loss of the data is allowed and a recovery time objective (RTO) that defines a duration of time in which the data must be restored after a disruption to a network attached storage appliance, wherein the network attached storage appliance is part of a storage cluster that provides computing storage services and offers a computing device access to a common set of data consolidated from a plurality of user systems; copying the data and the associated metadata into backup files; and generating a data structure with pointers to the backup files, based on a schedule configured to achieve the RPO and the RTO, wherein the data structure with pointers to the backup files comprises a file path associated with a status and at least one of the pointers to the backup files, wherein the status indicates whether data at a location specified by the file path is newly created, has been modified since a previous backup copy was performed, or is unchanged since the previous backup copy was performed.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
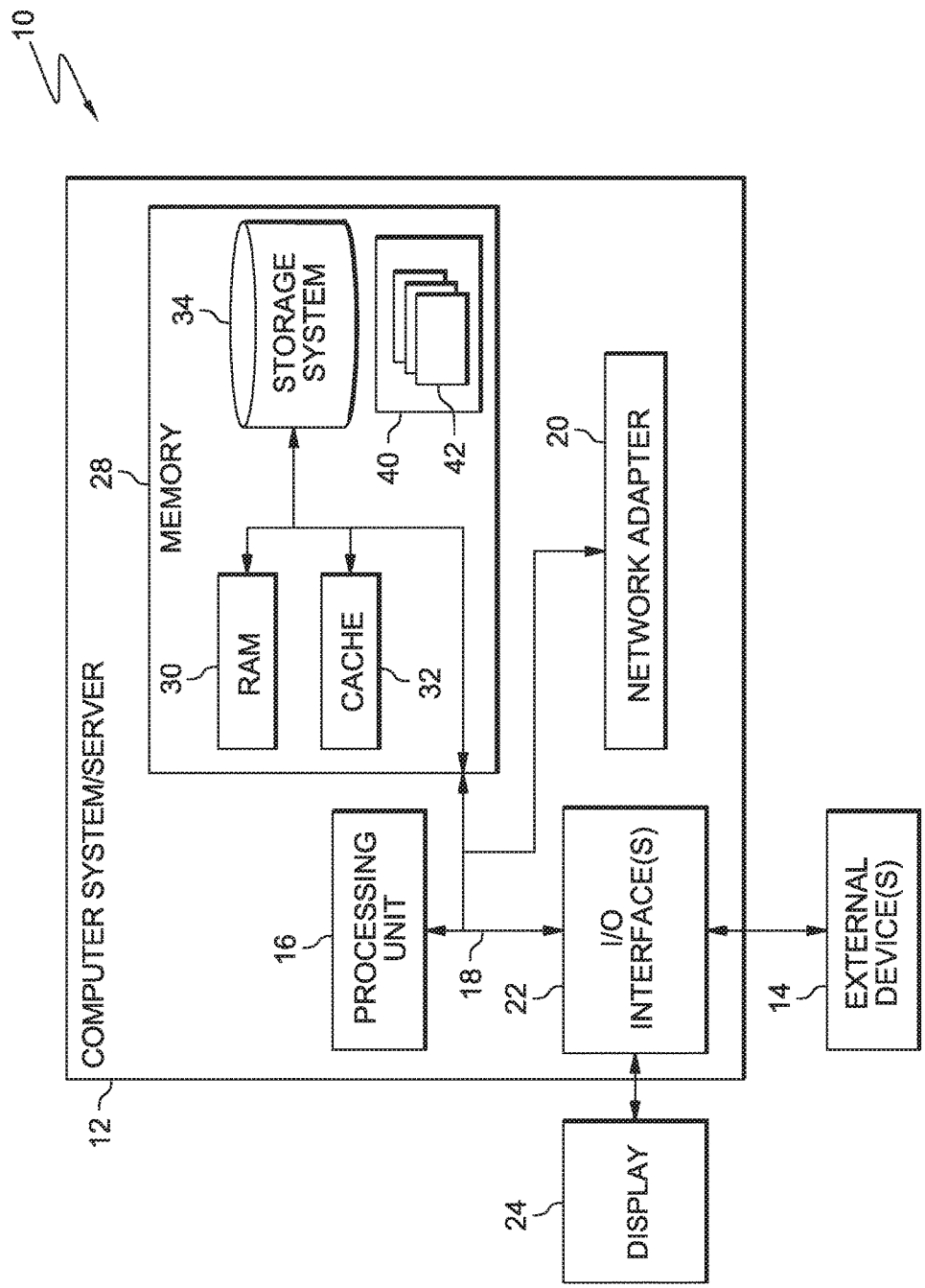
FIG. 1 depicts a networked (e.g. cloud) computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for protecting data in a networked (e.g. cloud) storage computing environment through asynchronous replication and remote backup of data and its associated metadata, which includes file system configuration information. Under embodiments of the present invention, data backup and recovery functionality is provided.

Specifically, the data backup and recovery functionality provides backup and transfer of data and file system configuration information from a primary location to a remote disaster recovery location, and restoration of the data and file system configuration information from the remote disaster recovery location to a desired target location. Moreover, the data backup and recovery functionality provides the capability for a cloud administrator to manage a service that protects customer data with point-in-time consistency at a local or remote location in a policy-based fashion.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary computer software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user/consumer to interact with computer system/server 12; and/or any devices (e.g., network card, modem, etc.) that enable computer system/server 12 to communicate with one or more other computing devices. Such communication can occur via I/O interfaces. 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or computer software components could be used in conjunction with computer system/server 12. Examples include, but are not limited to: microcode, device drivers, redundant processing units, external disk drive arrays, RAID systems, tape drives, and data archival storage systems, etc.

Figure 2:
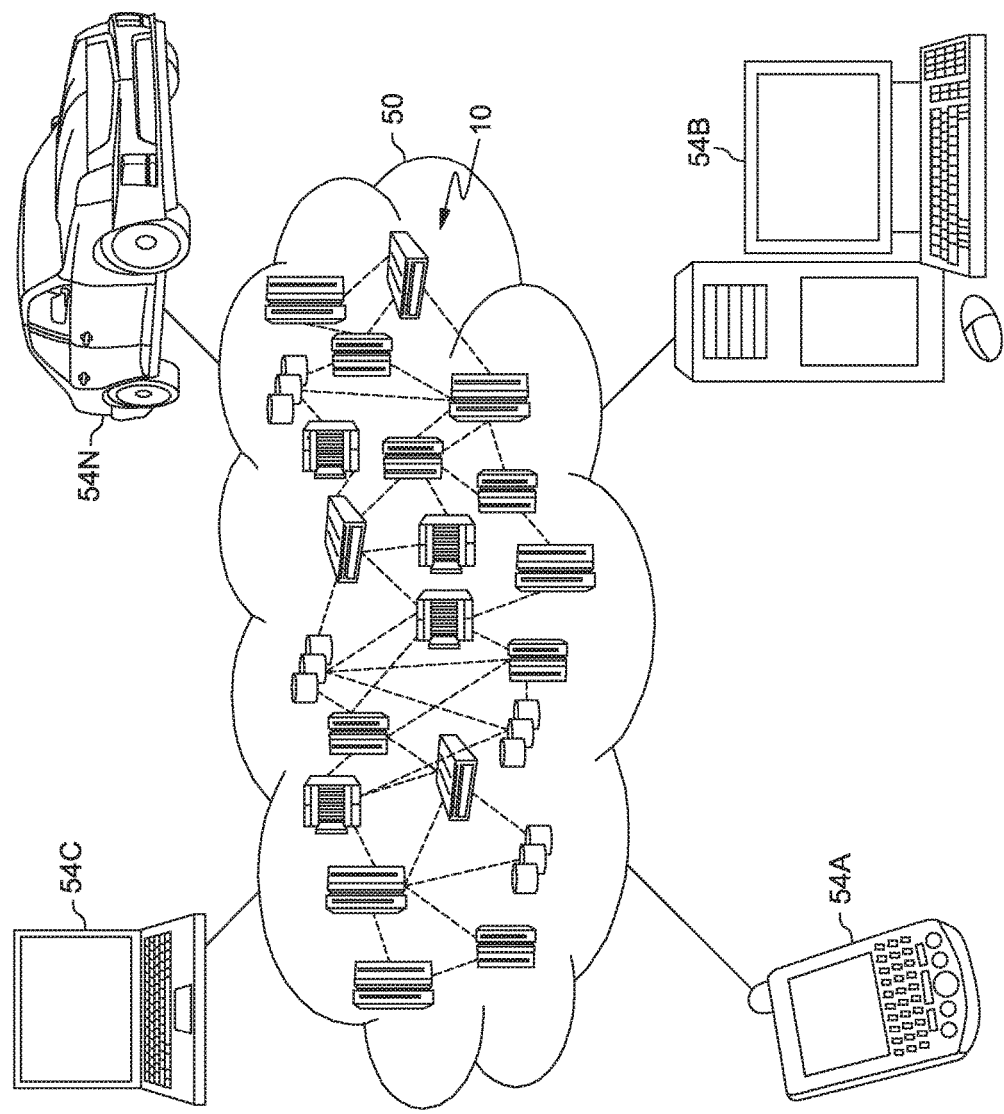
FIG. 2 depicts a networked (e.g. cloud) computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
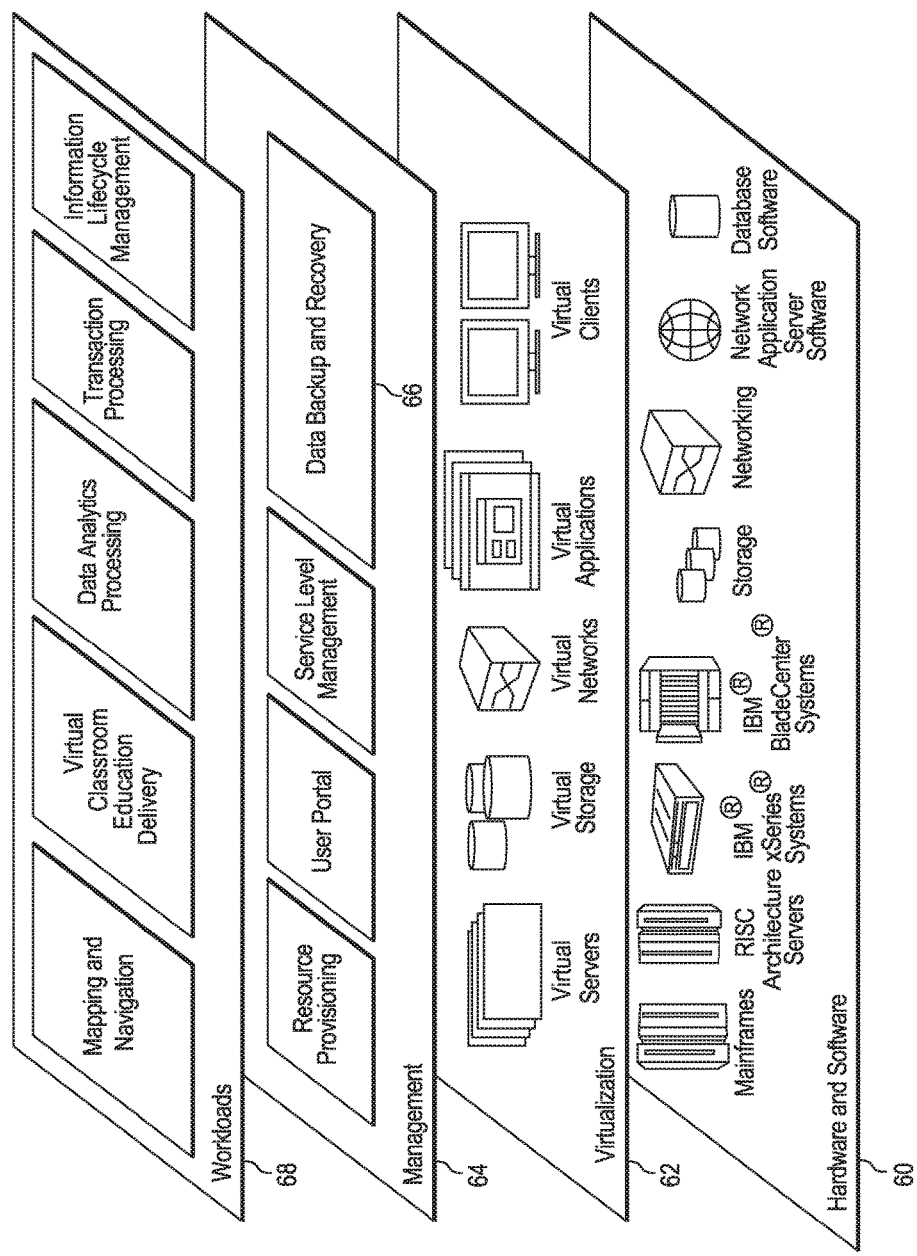
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and computer software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of computer software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

Management layer 64 provides for management of cloud services residing on servers within a cloud computing environment. In one embodiment, management layer 64 may provide the program modules and/or functionalities described below. Resource provisioning provides dynamic procurement of computing resources and other resources that are utilized to perform tasks within the cloud computing environment. User/consumer portal provides access to the cloud computing environment for consumers and system administrators. Service level management provides cloud computing resource allocation and management such that required service levels are met. Data backup and recovery functionality 66 includes one or more program modules that provides data backup and data restoration for remote data protection in a networked (e.g. cloud) storage computing environment.

It is understood that functions of the present invention as described herein may be performed by the data backup and recovery functionality 66, which can be tangibly embodied as modules of program code 42 (shown in FIG. 1) of program/utility 40 (shown in FIG. 1) residing at the cloud management layer 64. However, this need not be the case. Rather, the functionality recited herein could be carried out/implemented and/or enabled by other layers depicted in FIG. 3, such as workloads layer 68.

Workloads layer 68 provides examples of functionality for which the cloud computing environment may be utilized. In one embodiment workloads and functions which may be provided from this layer include: mapping and navigation; software development and lifecycle management; virtual classroom education delivery; data analytics processing; transaction processing; and information lifecycle management. As mentioned above, all of the foregoing examples described with respect to FIG. 3 are illustrative only, and the invention is not limited to these examples. In addition, workloads and applications are used synonymously.

It is reiterated that although this disclosure includes a detailed description on cloud computing, implementation of the teachings recited herein are not limited to a cloud computing environment. Rather, the embodiments of the present invention are intended to be implemented with any type of networked (e.g. cloud) storage computing environment now known or later developed.

Figure 4A:
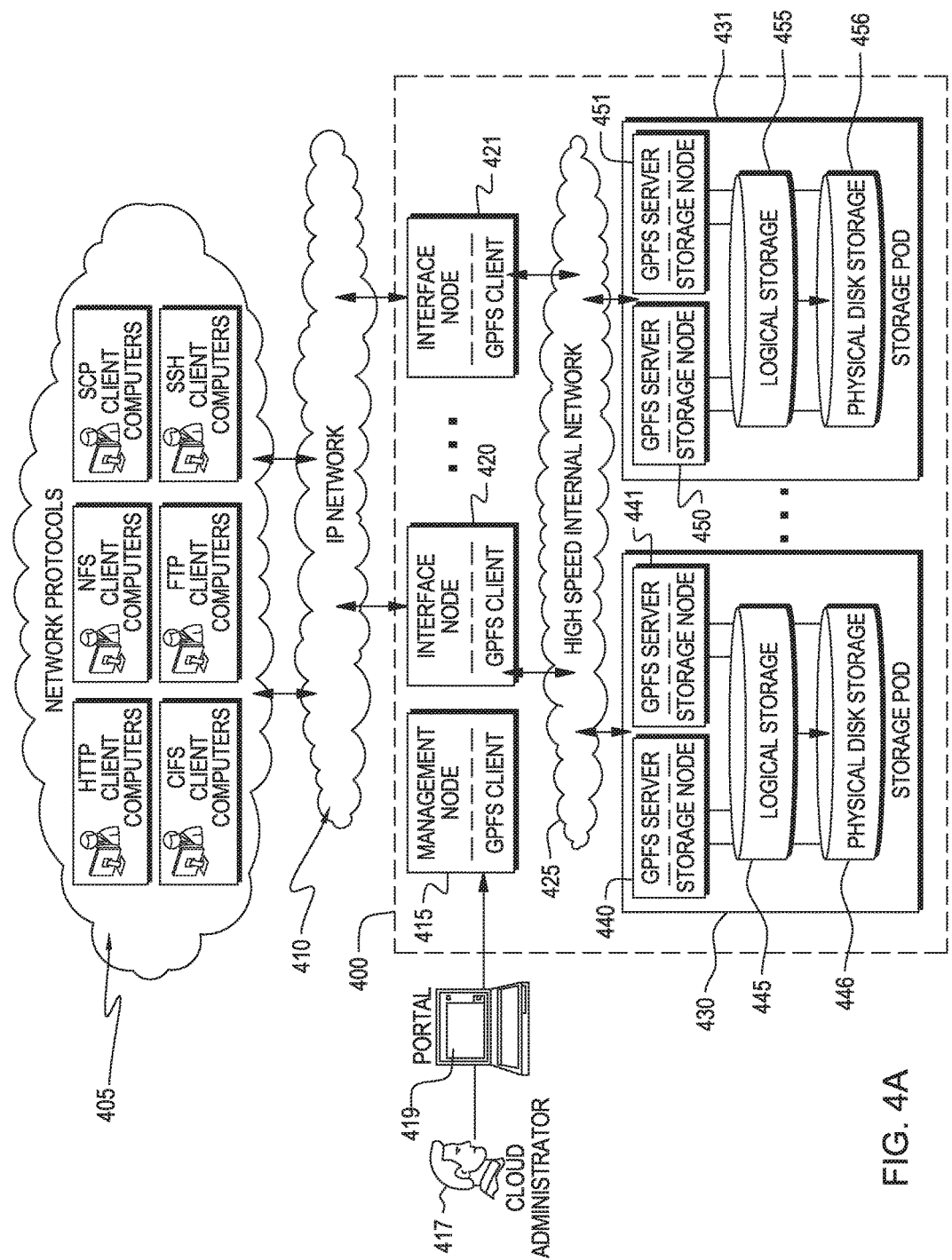
FIGS. 4A-4B depict a high-level architectural view of a network attached storage cluster supporting a disaster recovery infrastructure according to an embodiment of the present invention.

Referring now to FIG. 4A, a scale out network attached storage cloud infrastructure 400 that can be offered by a networked (e.g. cloud) computing storage service provider is shown. Storage cloud infrastructure 400 comprises support for client computers utilizing standards-based network protocols 405 which comprise Hypertext Transfer Protocol (HTTP), Network File System (NFS) Protocol, Secure Copy Protocol (SCP), Computer Internet File System (CIFS) Protocol, File Transfer Protocol (FTP), and Secure Shell (SSH) Protocol. Internet Protocol (IP) network 410 provides for connectivity between client computers utilizing protocols 405 and storage cloud infrastructure 400, so that a user can access files residing in storage cloud infrastructure 400. A cloud administrator 417 can utilize computer-based portal 419 to access management node 415. Through management node 415 and utilization of computer-based portal 419, administrator 417 can configure, manage and monitor storage cloud infrastructure 400, including data backup and restore policies. Restore policies are rules which may be implemented by computer program code in order to satisfy a user's requirements, which include business data retention, recovery point objective (RPO), and recovery time objective (RTO). Furthermore, storage cloud infrastructure 400 can have one or more interface nodes 420-421. Interface nodes 420-421 provide user access to the data and file services within cloud infrastructure 400, and may utilize standard protocols 405. Within cloud infrastructure 400, storage is arranged in storage pods 430 and 431, which each contain a pair of storage nodes 440-441 and 450-451, respectively. The interface nodes 420-421 are connected to the storage pods 430-431 respectively, via a high speed internal network 425. Moreover, interface node 420 and storage nodes 440-441 function together to provide direct access to physical storage 446 via logical storage pool 445. In addition, interface node 421 and storage nodes 450-451 function together to provide direct access to physical storage 456 via logical storage pool 455. Thus, a user is given the IP address assigned to an interface node, wherein the interface node can then be utilized to directly access data within a storage pod. Specifically, the storage pod will contain the user's data and file system configuration information.

Figure 4B:
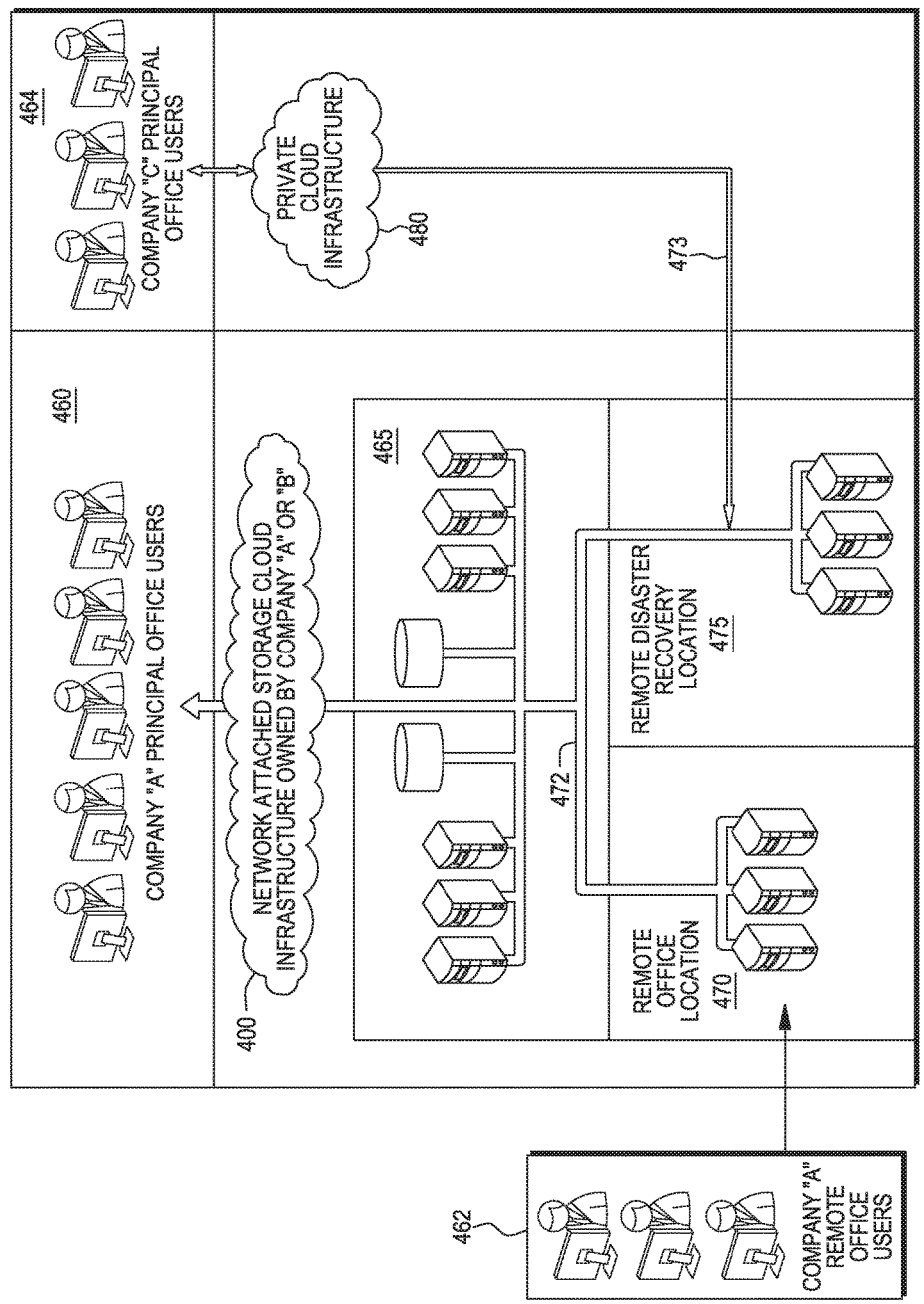

Referring now to FIG. 4B, which illustrates scale out network attached storage cloud infrastructure 400 in further detail, as well as support of other types of infrastructures including an infrastructure for a remote office location 470, and an infrastructure for business continuity such as a remote disaster recovery location 475. Scale out network attached storage cloud infrastructure 400 services can be offered through a networked (e.g. cloud) computing storage service provider in conjunction with a private cloud environment for private users, or in conjunction with a public cloud environment for public users.

In one embodiment, one purpose of a remote disaster recovery location 475 is to provide for the ability of Company "A" to continue business operations when primary computer software applications and computer hardware systems 465 are not accessible, or are accessible but not operating as required by Company A principal office users 460 and Company A remote office users 462. A remote office location 470 is where Company A has decided to locate an office staffed with remote users 462, at a location other than that of principal office users 460, for reasons which may include reducing employee commute time, increasing market presence, and/or improving customer service. Remote office users 462 working at remote office location 470 would also have access to Company A's computing systems via an application cluster at remote office location 470. Both principal office users 460 and remote office users 462 may access remote disaster recovery location 475 via network connection 472. Accordingly, embodiments of the present invention relate to remote data protection at remote disaster recovery location 475 owned by Company A or a separate business entity, Company "B".

In one embodiment of the present invention, Company A principal office users 460 and Company A remote office users 462 may store customer data within public cloud infrastructure 400 which is owned by the separate business entity, Company B. However, if Company A principal office users 460 and Company A remote office users 462 also decide to obtain remote data protection for disaster recovery purposes, then both users 460 and 462 could pay extra fees to have customer data replicated and protected remotely at remote disaster recovery location 475. Remote disaster recovery location 475 can be located at a separate physical location than public cloud infrastructure 400 based on Company A's preferred disaster recovery strategy.

In another embodiment, Company "C" principal office users 464 may store software application data in their own private cloud infrastructure 480. Company C may decide that remote data protection for business continuity purposes is needed in the event of a natural disaster, to meet governmental regulations, or for other reasons. Thus, Company A or Company B or whichever entity has responsibility for public cloud infrastructure 400, can provide remote data protection services for Company C principal office users 464 via network connection 473 to remote disaster recovery location 475. If Company C provides Company B with access to their complete set of application data, then Company B can perform a complete application restoration. However, if Company C does not provide a complete set of application data to Company B, then Company B can only perform "restoration at the file system level onward." The phrase "restoration at the file system level onward," means that if Company B has responsibility for Company C's application stack then Company B can perform an application specific quiesce/write-suspend, perform a GPFS specific quiesce/write-suspend, and create a GPFS snapshot. However, if Company B does not have responsibility for Company C's application stack then Company B can only perform a GPFS specific quiesce/write-suspend, and create a GPFS snapshot. A quiesce operation will temporarily force all users off a specified instance and database, and puts the database into quiesced mode. The quiesce/write-suspend mode is a restricted mode, where only users with authority are allowed to connect to the instance or the database within public cloud infrastructure 400. In quiesce/write-suspend mode, the users with authority can perform administrative tasks on the database within public cloud infrastructure 400.

Figure 5:
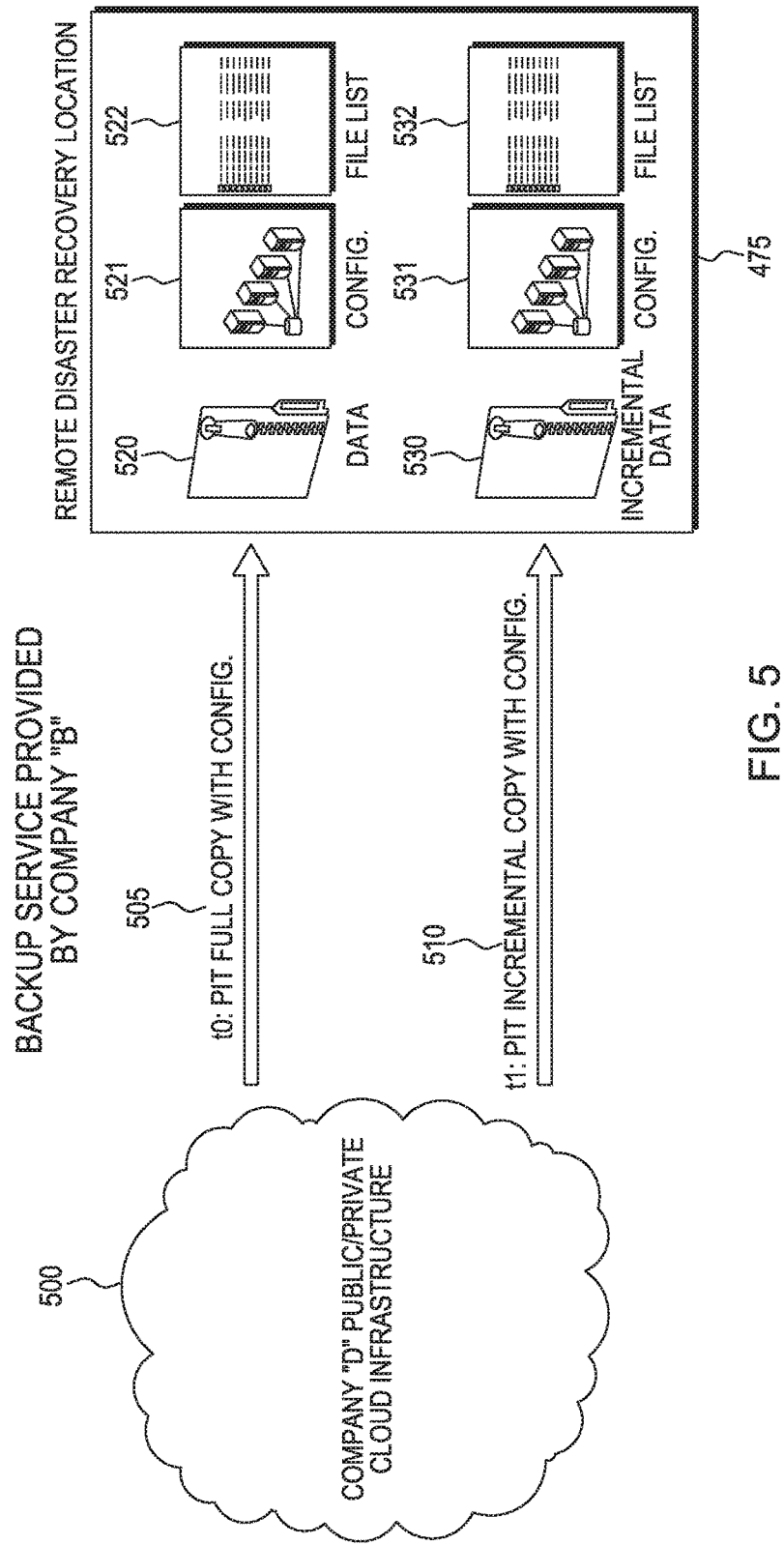
FIG. 5 depicts a data protection remote backup process in a networked (e.g. cloud) storage environment according to an embodiment of the present invention.

FIG. 5 depicts a backup process for restoration of remotely protected data in remote disaster recovery location 475 (also shown in FIG. 4B). In one embodiment, there is data stored in Company "D" public/private cloud infrastructure 500. At time t0, Company B, which provides data protection services for Company D, takes a point-in-time (PIT) full backup copy 505 of Company D's data and file system configuration, and creates three components, which include a data file 520, a configuration file 521, and a file-list 522 that are all transferred to remote disaster recovery location 475. Data file 520 may contain, for example, Company D's actual data such as customer information which can be compressed, in one example as a zip file, in order to reduce the storage space required to maintain the data. Configuration file 521 is a full backup copy of Company D's General Parallel File System (GPFS) metadata. Specifically, configuration file 521 contains information regarding quotas, filesets, policies, access control lists, primary nodes, and secondary nodes. File-list 522 contains information regarding where the copied data resides within remote disaster recovery location 475. After a full backup copy is performed data is copied and transferred to remote disaster recovery location 475. The transfer of the data is performed by Company B utilizing rsync technology, so that Company B is not storing data file 520 and data file 530 in the same environment as the original data. Rsync is a software application/protocol, which can support a Unix based system to provide for the synchronization of files and directories between one location and another. Rsync technology can save bandwidth and minimize data transfers. However, the remote transfer of backup data can be performed using rsync application/protocol or other protocols including ftp or http. Moreover, many methods for the transfer of data to a remote location exist, which include manual data transfer, computer scheduled data transfer, or a combination of both manual and computer scheduled data transfer.

At time t1, Company B makes a point-in-time incremental backup copy of data 510 of Company D's data and file system configuration, and creates three components which are: data file 530, configuration file 531, and file-list 532 which are all transferred to remote disaster recovery location 475. As shown in FIG. 5, data file 530 can be compressed as a zip file in order to reduce the storage space required to maintain the data. Thus, after a full backup copy is made at time t0, subsequently scheduled backup copies will be incremental backup copies of data and file system configuration information. As a result, incremental backup copies of data includes only new data that has been created after the full backup copy was performed, or data that has been modified since a previous backup copy was performed. Furthermore, after an incremental backup copy is performed data is copied and transferred to remote disaster recovery location 475. The transfer of the incremental copy of backup data is performed by Company B, utilizing rsync technology, so that Company B is not storing data file 520 and data file 530 in the same environment as the original data. However, the remote transfer of backup data can be performed using other protocols including ftp or http. Moreover, many remote transfer of data methods exist to transfer data to a remote data location, and those methods include manual data transfer, computer scheduled data transfer, or a combination of both a manual and computer scheduled data transfer.

Figure 6:
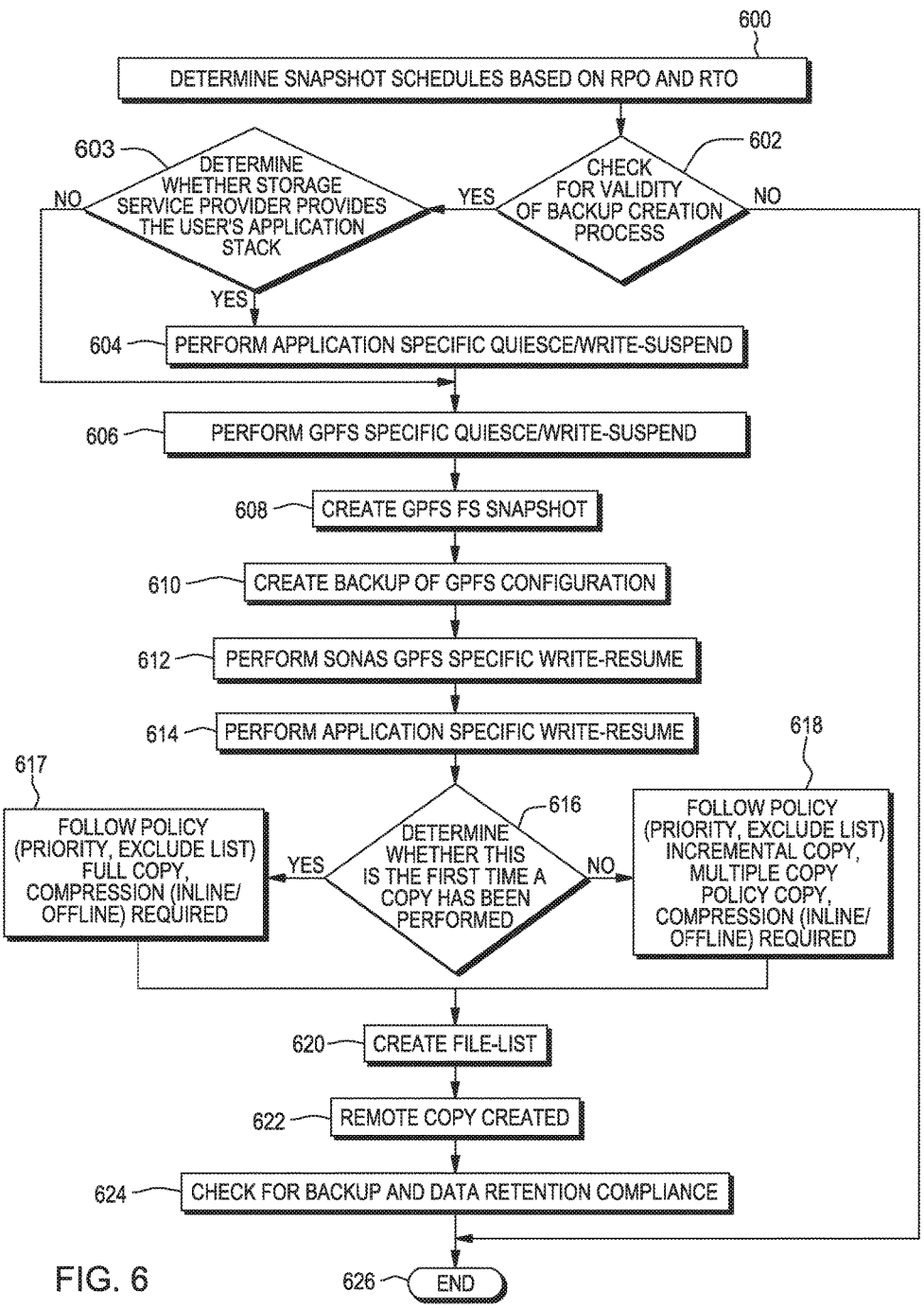
FIG. 6 depicts a method flow diagram for remote data protection in a networked (e.g. cloud) computing environment according to an embodiment of the present invention.

Referring now to FIG. 6, a method flow diagram depicting a data backup process, offered by a networked (e.g. cloud) computing storage service provider, according to one embodiment of the present invention, is shown. Thus, the service provider has a network attached storage cloud infrastructure. In one embodiment, the following steps which are described with reference to FIG. 6 may be performed by data backup and recovery functionality 66 (shown in FIG. 3). As depicted in step 600, snapshot schedules are determined based on a company's recovery point objective (RPO) and recovery time objective (RTO). In step 602, validity of the backup creation process is checked by performing the following tasks: check for GPFS maximum snapshot limit, check for existence of previously created snapshot (resulting from the backup creation process), and check for network connectivity. In step 603, the storage service provider that has responsibility for the user's application stack is determined. If a networked (e.g. cloud) computing storage service provider has responsibility for the user's complete application stack (i.e., application, server, and storage) then, in step 604, the storage service provider can perform an application specific quiesce/write-suspend and proceed to step 606. However, if the networked (e.g. cloud) computing storage service provider does not have responsibility for the user's application stack, then the networked (e.g. cloud) computing storage service provider does not perform step 604, which is an application specific quiesce/write-suspend, instead the computing storage service provider performs step 606.

In step 604, an application specific quiesce/write-suspend is performed. In step 606, the GPFS specific quiesce/write-suspend is performed. Steps 604 and 606 prevent a production application from writing data to storage within the network attached storage cloud infrastructure of the service provider by performing an application specific quiesce/write-suspend. In step 608, a GPFS snapshot is created. In step 610, a backup of a GPFS configuration is created. In step 612, a specific write-resume is performed. In step 614, an application specific write-resume is performed. Steps 612 and 614 permit the production application to resume writing data to storage within the network attached storage cloud infrastructure of the service provider by a specific write-resume command. Next in step 616, a determination is made as to whether this is the first time, a copy of the data and file system configuration has been performed. If the determination made in step 616 is that this is the first time a copy of the data and file system configuration information has been performed, then step 617 is performed next. In step 617, a full point-in-time copy, based on a company's replication policy, is created. However, if the determination made in step 616 is that it is not the first time a copy of the data and file system configuration information has been performed, and then step 618 is performed next. In step 618, only an incremental backup copy is performed, which includes only new data that has been created after the full backup copy was performed, or data that has been modified since a previous backup copy was performed.

In step 620, a file-list is created, which contains the location of where the full backup copy and incremental backup copies of the data and file system configuration are stored within remote disaster recovery location 475 (shown in FIG. 4B). Next in step 622, a remote copy of the data, file system configuration, and file-list is created at remote disaster recovery location 475. Then, in step 624, policy compliance is checked, which includes ensuring that the restore does not span more than a company specified number of backups, and ensuring that the backup data is retained according to the company's policies. Specifically, to perform step 624 a policy is created that ensures the backup process does not span more than a specified number of full and incremental backup copies. An asynchronous process determines whether the data retention compliance policy has been violated, and if the data retention compliance policy has been violated the asynchronous process copies redundant data or performs a full restore to create a new backup location. In addition, affected file-lists are modified by the asynchronous process. Lastly, the data backup process ends at step 626.

Figure 7:
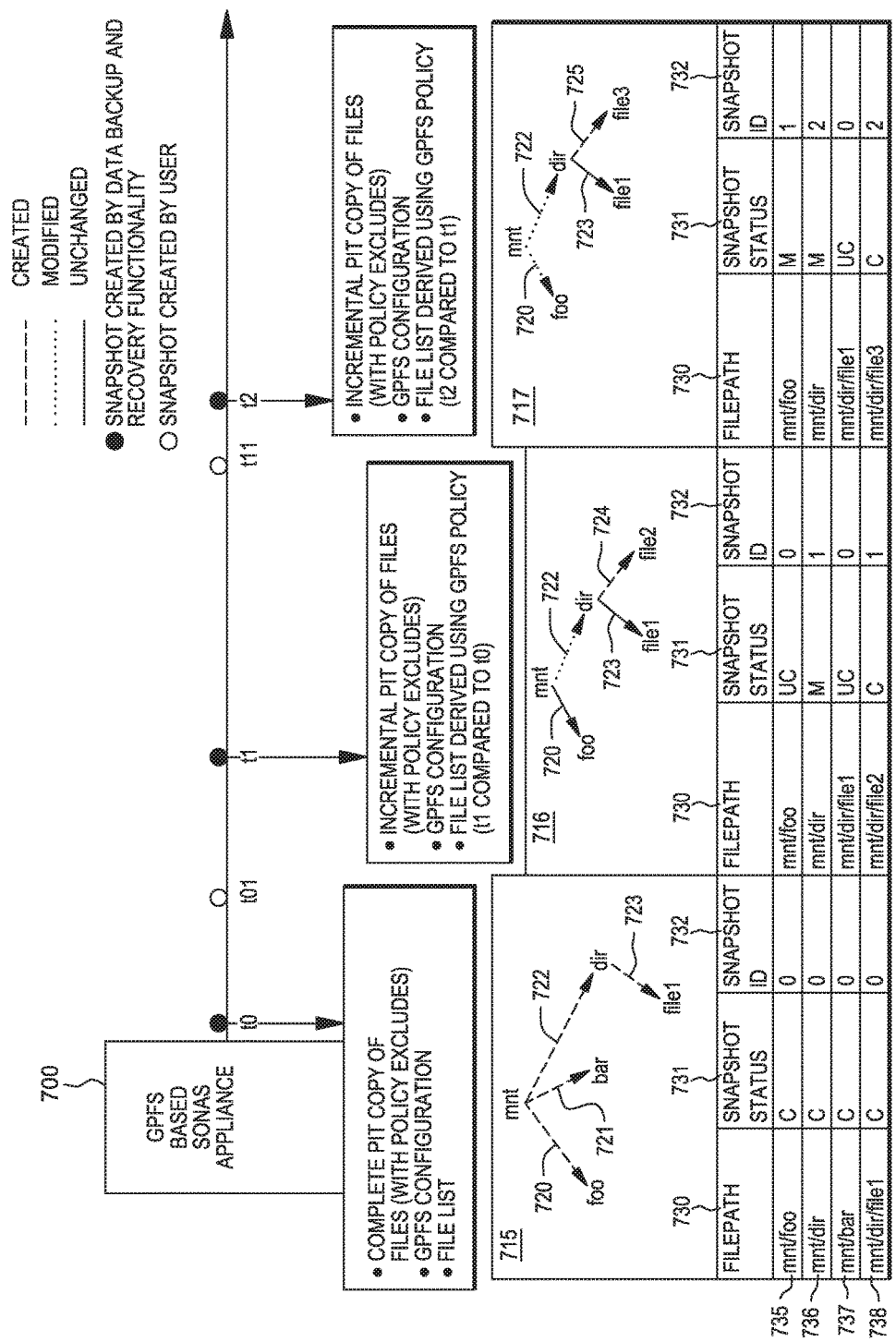
FIG. 7 depicts creation of file-lists from point-in-time (PIT) snapshots of data and file system configuration information according to an embodiment of the present invention.

Referring now to FIG. 7, a process for creating a file-list is depicted. FIG. 7 further depicts how file-lists can be utilized to restore a company's computer software applications and data state to that of a specific point in time. In one embodiment, the process described herein below with reference to FIG. 7 may be performed by data backup and recovery functionality 66 (shown in FIG. 3). In one embodiment, a file-list is implemented by utilizing a hash map based data structure that is analogous to a database table with a primary key. Specifically, a hash map may be utilized to search and store values, and can provide advanced search functionality for applications. In another embodiment, a file-list may be implemented by utilizing database tables, simple text files, delimiter based files, XML files, or other in-memory structured/semi-structured documents or data structures.

In one embodiment, a scale out network attached storage (SONAS) appliance 700 is utilized. SONAS is a high-performance scale out file management solution that can provide fast, reliable access to a common set of file data from tens of thousands of user systems. SONAS enables users to efficiently consume storage by consolidating petabytes of data into an integrated solution. Moreover, SONAS simplifies networked (e.g. cloud) storage management by consolidating many network attached storage devices into one centrally managed, centrally deployed, flexible, and dynamic storage cluster. At time t0, on SONAS appliance 700, there exists a file system named "mnt" with the following four file paths: mnt/foo file path 720, mnt/dir file path 722, mnt/bar file path 721, and mnt/dir/file1 file path 723. At time t0, point-in-time compressed copies of all files on SONAS appliance 700 are made. Next, a file-list 715 is then created utilizing a data table with columns and rows, which includes a column for file path 730, a column for snapshot status 731, a column for snapshot ID 732, row 735 containing an entry for file path 720, row 736 containing an entry for file path 722, row 737 containing entries for file paths 721 and 723, and row 738 containing entries for file paths 723-725.

Column file path 730 indicates the location of the point-in-time compressed copies of data within a given file at remote disaster recovery location 475 (shown in FIG. 4B). Column file path 730 can have a plurality of entries corresponding to file paths 720-725. Column snapshot status 731, indicates whether a copy of data was created (C) for the first time, was modified (M), or was unchanged (UC). Each entry for file paths 720-725 will have a corresponding snapshot status 731 of C, M, or UC. Thus, if a copy of file paths 720-725 was created for the first time then the corresponding snapshot status 731 for each of the file paths 720-725 is C (i.e., created). If any one of the file paths 720-725 contains data that was modified, then the file path that contains modified data would have a corresponding snapshot status 731 of M (i.e., modified). Lastly, if any one of the file paths contains data that was completely unchanged then the file path that contains completely unchanged data would have a corresponding snapshot status 731 of UC (i.e., unchanged). Accordingly, in the present example described with reference to FIG. 7, and specifically file-list 715, at time t0 a point-in-time copy was made for the first time, so for each of the entries corresponding to file paths 720-723 the snapshot status 731 is C. Moreover, snapshot ID 732 defines the point-in-time compressed copy, where data in a particular file path can be found. For example, at time t0 the corresponding snapshot ID 732 for all file paths 720-723 is 0, which records that a point-in-time compressed copy of data within a given file path 730, at time t0, can be found in t1.zip. However, if the corresponding snapshot ID 732 for file paths 720-723 is 1, then the point-in-time compressed copy of data within a given file path 730, at time t1, would is found in t1.zip. Thus, snapshot ID 732 defines which point-in-time compressed copy (e.g. zip file) is to be selected in order to find data within a given file path 730 at a given point in time, at remote disaster recovery location 475.

Next at time t01, FIG. 7 illustrates that a user (e.g. company) who subscribes to data protection services can make their own backup copy, but their action of making their own copy will not affect the operation of data backup and recovery process described herein. At time t1, an incremental point-in-time compressed copy of files on appliance 700 is created. Subsequent point-in-time copies, made after time t0, can also be referred to as incremental point-in-time copies. At time t1, file-list 716 is created having entries corresponding to file paths 720 and 722-724. In addition, if data has been newly created (i.e., C), modified (i.e., M), or is unchanged (i.e., UC) then snapshot status 731 for entries corresponding to file paths 720 and 722-724 is updated to reflect the correct status as either C, M, or UC. Moreover, since an incremental backup copy is being created at time t1, if data within a file path has been modified or newly created at time t1, then the snap shot ID 732 is 1 for the entries corresponding to file paths 720 and 722-724. As a result, in the present example depicted in FIG. 7, entries corresponding to file paths 722 and 724 have a snap shot ID 732 of 1. The snapshot ID of 1, records that a point-in-time compressed copy of data for a specific file path can be found in t1.zip.

In the present example, in file-list 716 at time t1, the entry corresponding to file path 720 was unmodified so its snapshot status 732 is UM and its snapshot ID is 0. File path 721 was deleted, so it no longer exists at time t1. File path 722 was modified so its snapshot status 732 is M and its snapshot ID is 1. File path 723 was unmodified so its snapshot status 732 is UM and snapshot ID is 0. At time t1, an entry corresponding to file path 724 (i.e. mnt/dir/file2) was newly created, so its corresponding snapshot status is C and its snapshot ID is 1.

Next, at time t11, FIG. 7 illustrates that a user (e.g. company) who subscribes to data protection services may again make their own copy, but their action of making their own copy will not affect the operation of the data backup and recovery process described herein. In the present example, another incremental backup copy is made at time t2. At time t2, file-list 717 is created with entries corresponding to file paths 720, 722-723, and 725. In addition, if data has been newly created (i.e., C), modified (i.e., M), or is unchanged (i.e., UC) then snapshot status 731 for entries corresponding to file paths 720, 722-723, and 725 is updated to reflect the correct status as either C, M, or UC. Thus, for file-list 717 at time t2 the entry corresponding to file path 720 contains data that was modified, so the snapshot status 732 for the entry corresponding to file path 720 is M, and the snapshot ID is 1. The entry corresponding to file path 722 was modified, so the snapshot status 732 for the entry corresponding to file path 722 is M and the snapshot ID is 2. The entry corresponding to file path 723 was unchanged, so the snapshot status 732 for the entry corresponding to file path 723 is UC, and the snapshot ID is 0. The entry corresponding to file path 724 was deleted, so this entry no longer exists at time t2. At time t2, an entry corresponding to file path 725 (i.e. mnt/dir/file3) was newly created, so the corresponding snapshot status for the entry corresponding to file path 725 is C, and the snapshot ID is 2.

In addition, the data backup and recovery process described herein provides functionality that ensures no single point of failure. In one example, file1 is only present at time t0, because file1 was copied only once, and a single pointer to file1 on file-list 715 for time t0, t1, and t2 was made. However, suppose that when a compressed point-in-time backup copy is unzipped it is determined that file1 is corrupted. If there are no additional copies with corresponding pointers to them, then file1 would have a single point of failure. To resolve this single point of failure, a policy can be created, wherein data backup and recovery functionality 66 makes a copy of file1 at time t0, and makes a second copy of file1 at time t1 (i.e. even though file1 is unchanged a second copy is made) with pointers to the respective copies within file-list 715. Thus, if file1 is somehow corrupted at time t0, there is another snapshot for time t1 that is available. The present example, illustrated in FIG. 7 utilizes a plurality of file-lists, but other embodiments may be implemented by using a single file-list.

Figure 8:
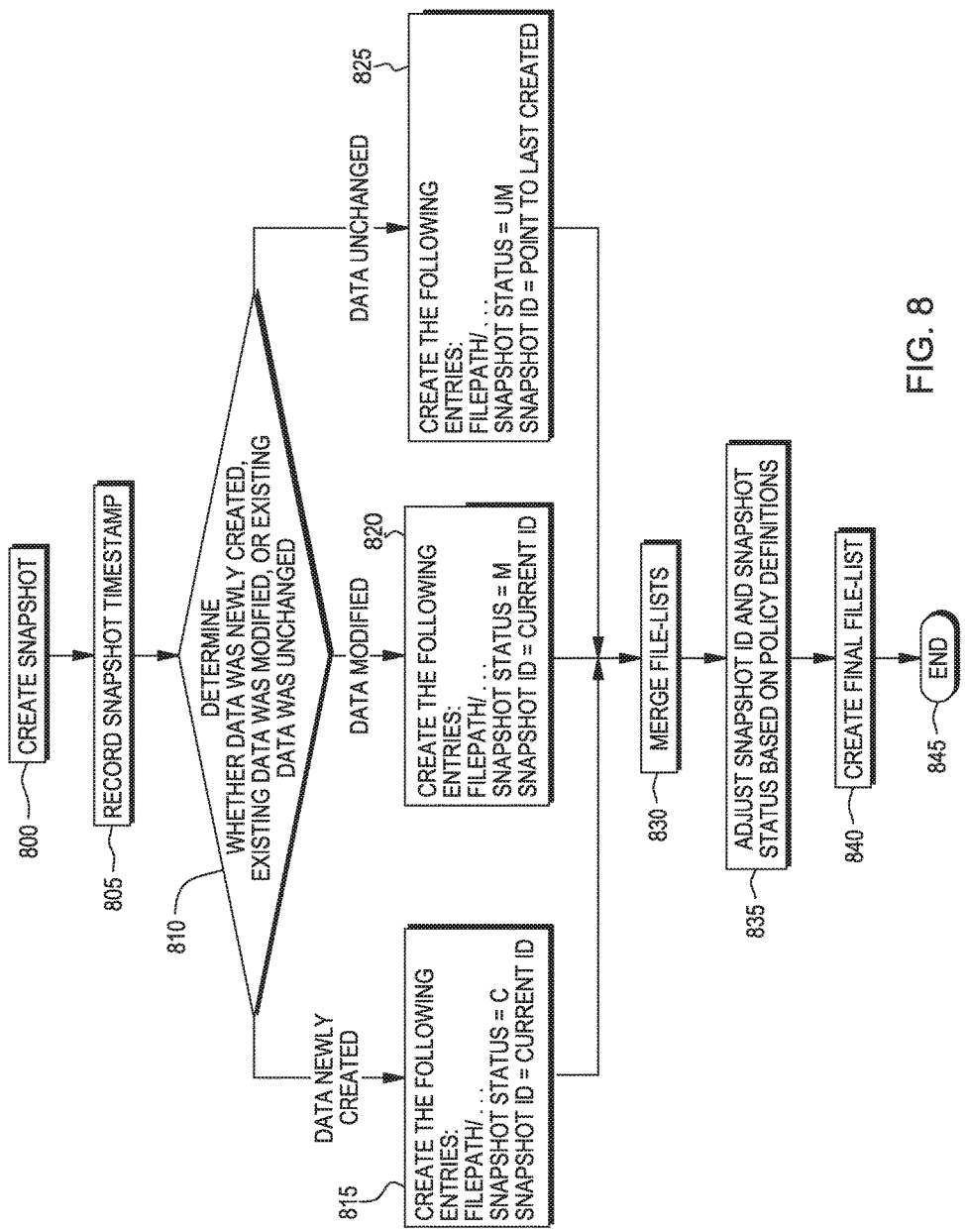
FIG. 8 depicts a method flow diagram for creation of file-lists according to an embodiment of the present invention.

Referring now to FIG. 8, a method flow diagram for a file-list creation process according to an embodiment of the present invention is depicted. In one embodiment, the process described herein, with respect to FIG. 8, may be performed by data backup and recovery functionality 66 (shown in FIG. 3). In step 800, a snapshot is created. Then in step 805, a snapshot timestamp is recorded. The snapshot timestamp is a potential restore-point, which can be utilized if a user requests to restore data at a specific point in time.

Next in step 810, a policy framework is utilized to determine whether data was newly created, existing data was modified, or existing data was unchanged. In step 810, if data was newly created the process proceeds to step 815. In step 815, for each file path 730 (shown if FIG. 7) with newly created data, data backup and recovery functionality 66 creates a corresponding entry is created for snapshot status 731 (shown in FIG. 7) with a value C, and an entry for snapshot ID 732 (shown in FIG. 7) with a value corresponding to a new location containing a compressed copy of the backup data for a given point in time. Alternatively, in step 810, if existing data was modified, the process proceeds to step 820. In step 820, for each file path 730 with modified data, a corresponding entry is created for snapshot status 731 with a value M, and an entry for snapshot ID 732 with a value corresponding to a new location containing a compressed copy of the backup data for a given point in time. However in step 810, if existing data was unchanged the process proceeds to step 825. In step 825, for each file path 730 with unchanged data, a corresponding entry is created for snapshot status 731 with value UC, and an entry for snapshot ID 732 with a value corresponding to an existing location already containing a compressed copy of the backup data for a given point in time.

After a corresponding entries for file path 730, corresponding entries for snapshot status 731, and snapshot ID 732 have been created, the process proceeds to step 830, where entries that may have been generated in steps 815, 816, and 825 are merged into a single file-list. Next, in step 835, snapshot ID 732 and snapshot status 731 may be adjusted based on policy definitions. For example, a policy which defines no single point of failure can include updating snapshot ID 732 for an entry corresponding to a file path within a file-list, in order to point to a location of an additional copy that was made. Then, in step 840 a final file-list is generated, and the process ends at step 845. The file-list creation process is an operation that may, in one example, be performed by a sub-module within data backup and recovery functionality 66. Further, the process described herein can run on a scheduled basis, and be customized to achieve a user's requirements in accordance with the user's (e.g. company's) recovery plan objective (RPO) and recovery time objective (RTO).

Figure 9:
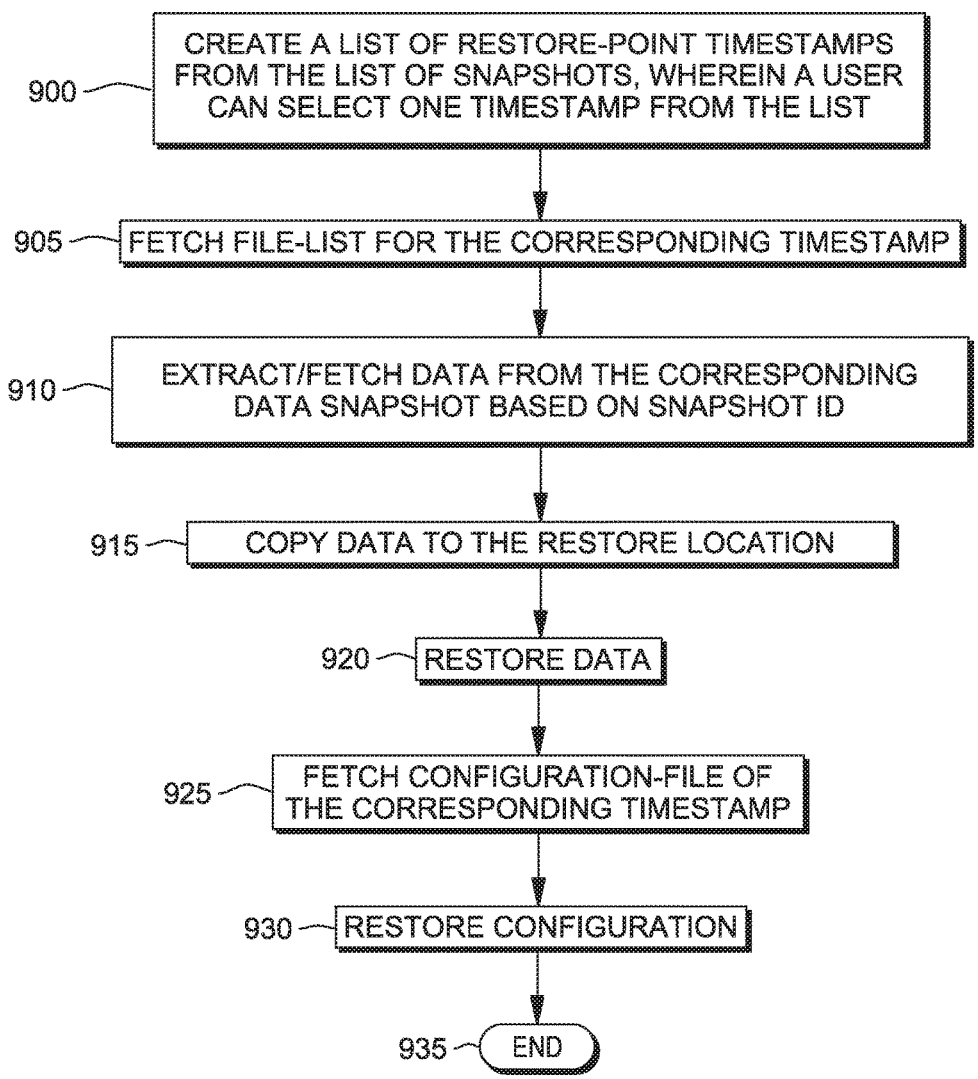
FIG. 9 depicts a method flow diagram for restoration of data and configuration files in a networked (e.g. cloud) computing environment according to an embodiment of the present invention.

Referring now to FIG. 9, a method flow diagram for a restore process performed by data backup and recovery functionality 66 (shown in FIG. 3), according to an embodiment of the present invention is depicted. In one embodiment, the process described herein, with respect to FIG. 9, may be performed by data backup and recovery functionality 66 (shown in FIG. 3). In step 900, a restore-point timestamp list is created, and a user (e.g. storage cloud administrator) who wants to perform a data restore operation can select a timestamp from the timestamp list. In step 905, the file-list is fetched for the corresponding timestamp selected by the user. In step 910, for each file path entry in the file-list, point-in-time compressed data is extracted based on a corresponding value in snapshot ID 732 (shown in FIG. 7), where snapshot ID 732 is utilized to define the location of the compressed data for a given point in time. In step 915, after the point-in-time compressed backup data has been extracted, the backup data is transferred to a restore location (e.g. remote disaster recovery location 475, shown in FIG. 4B).

Next in step 920, the backup data is restored. Specifically, step 920 involves extracting the backup data that was compressed, and organizing the backup data on a set of target logical storage that is provided at the target location (e.g., remote disaster recovery location 475). In step 925, a configuration file is retrieved that corresponds to the timestamp selected by the user. Then in step 930, configuration information from the configuration file is restored. After completion of step 930, the restore processes ends at step 935.

The flowchart and block diagrams, in FIG. 6, and FIGS. 8-9 illustrates the functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While shown and described herein as a solution for restoration of remotely protected data in a networked storage computing environment, it is understood that the invention further provides various alternative embodiments. For example, in one embodiment, the invention provides a computer-readable/useable medium that includes computer program code to enable a computer infrastructure to provide functionality for restoration of remotely protected data in a networked storage computing environment as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide functionality for restoration of remotely protected data in a networked storage computing environment. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for restoration of remotely protected data in a networked storage computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the term "program code" is any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/computer software program, component software or a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer implemented method for remote protection of data in a networked storage computing environment, the method comprising the steps of:
   determining a remote data protection action for data and associated metadata according to a policy framework;
   recording, by a processor, the data and the associated metadata at specific points-in-time based on the policy framework enforcing a recovery point objective (RPO) that defines a maximum time period in which loss of the data and the associated metadata is allowed and a recovery time objective (RTO) that defines a duration of time in which the data and the associated metadata must be restored after a disruption to a network attached storage appliance, the associated metadata including file system configuration information, and the network attached storage appliance being part of a storage cluster providing computing storage services and offering a computing device access to a common set of data consolidated from a plurality of user systems;
   copying, by the processor, the data and the associated metadata into backup files; and
   generating, by the processor, a first data structure with pointers to the backup files, based on a schedule configured to achieve the RPO and the RTO according to the policy framework, wherein the first data structure with the pointers to the backup files comprises:
      a file path associated with a status corresponding to a set of data stored at a location specified by the file path, the set of data including the data and the associated metadata copied into the backup files; and
      at least one of the pointers to the backup files of the set of data stored at the location, the status indicating whether the set of data is newly created, has been modified since a previous backup copy was performed, or is unchanged since the previous backup copy was performed; and generating subsequent data structures by utilizing the first data structure;
   wherein:
   the pointers to the backup files of the first data structure prevent re-copying of unmodified data of the first data structure, the unmodified data having not been modified since the first data structure was generated.

2. The method of claim 1, wherein the step of recording comprises:
   performing an application specific write-suspend, a General Parallel File System (GPFS) write-suspend, recording a GPFS file system snapshot, recording a GPFS configuration, performing a GPFS specific write-resume, and performing an application specific write-resume.

3. The method of claim 1, wherein the step of copying further comprises:
   compressing a full backup copy of the set of data created at a first time that the step of copying is performed, and subsequently compressing an incremental backup copy of the data and the associated metadata.

4. The method of claim 1, wherein:
   the remote data protection action is a pre-determined action corresponding to whether the data and the associated metadata is newly created, the data and associated metadata is modified from a previously stored version; the data and associated metadata is unchanged from a previously stored version.

5. The method of claim 4, wherein:
   the pre-determined action corresponding to the data being newly created is, for the file path having newly created data, create a corresponding entry for a snapshot status and an entry for a snapshot ID, the snapshot ID including a value corresponding to a new location containing a compressed copy of the data at a specified point in time.

6. The method of claim 1, wherein the file system configuration information includes file system quotas, filesets, and access-control-lists.

7. The method of claim 1, further comprising:
   transferring the backup files and the first data structure to a backup location for storage on a storage device.

8. A system for remote protection and restoration of data in a networked storage computing environment, the system comprising:
   a bus;
   a processor coupled to a bus;
   a memory medium coupled to the bus, the memory medium comprising instructions, the instructions executed by the processor to:
      determine a remote data protection action for data and associated metadata according to a policy framework;
      record the data and the associated metadata at specific points-in-time based on the policy framework enforcing a recovery point objective (RPO) that defines a maximum time period in which loss of the data and the associated metadata is allowed and a recovery time objective (RTO) that defines a duration of time in which the data and the associated metadata must be restored after a disruption to a network attached storage appliance, the associated metadata including file system configuration information, and the network attached storage appliance being part of a storage cluster providing computing storage services and offering a computing device access to a common set of data consolidated from a plurality of user systems;

copy the data and associated metadata into backup files; and generate a first data structure with pointers to the backup files, based on a schedule configured to achieve the RPO and the RTO according to the policy framework, wherein the first data structure with the pointers to the backup files comprises:
- a file path associated with a status corresponding to a set of data stored at a location specified by the file path, the set of data including the data and the associated metadata copied into the backup files; and
- at least one of the pointers to the backup files of the set of data stored at the location, the status indicating whether the set of data is newly created, has been modified since a previous backup copy was performed, or is unchanged since the previous backup copy was performed; and generate subsequent data structures by utilizing the first data structure;

wherein:
the pointers to the backup tiles of the first data structure prevent re-copying of unmodified data of the first data structure, the unmodified data having not been modified since the first data structure was generated.

9. The system of claim 8, wherein the step of recording comprises:
performing an application specific write-suspend, a General Parallel File System (GPFS) write-suspend, recording a GPFS file system snapshot, recording a GPFS configuration, performing a GPFS specific write-resume, and performing an application specific write-resume.

10. The system of claim 8, wherein the step of copying further comprises:
compressing a full backup copy of the set of data created at a first time that the step of copying is performed, and subsequently compressing an incremental backup copy of the data and the associated metadata.

11. The system of claim 8, further comprising instructions to:
determine to perform a remote data protection process responsive to exceeding a maximum number of snapshots and an existence of a previously created snapshot.

12. The system of claim 8, wherein the file system configuration information includes file system quotas, filesets, and access-control-lists.

13. The system of claim 8, wherein the first data structure is implemented by utilizing at least one of the following: a hash map based data structure, database tables, and other in-memory data structures.

14. A computer program product for remote protection and restoration of data in a networked storage computing environment, the computer program product comprising a non-transitory computer readable storage media, and program instructions stored on the non-transitory computer readable storage media, to:
determine a remote data protection action for data and associated metadata according to a policy framework;

record the data and the associated metadata at specific points-in-time based on the policy framework enforcing a recovery point objective (RPO) that defines a maximum time period in which loss of the data and the associated metadata is allowed and a recovery time objective (RTO) that defines a duration of time in which the data and the associated metadata must be restored after a disruption to a network attached storage appliance, the associated metadata including file system configuration information, and the network attached storage appliance being part of a storage cluster providing computing storage services and offering a computing device access to a common set of data consolidated from a plurality of user systems;

copy the data and the associated metadata into backup files; and generate a first data structure with pointers to the backup files, based on a schedule configured to achieve the RPO and the RTO according to the policy framework, wherein the first data structure with the pointers to the backup files comprises:
- a file path associated with a status corresponding to a set of data stored at a location specified by the file path, the set of data including the data and the associated metadata copied into the backup files; and
- at least one of the pointers to the backup files of the set of data stored at the location, the status indicating whether the set of data is newly created, has been modified since a previous backup copy was performed, or is unchanged since the previous backup copy was performed; and generating subsequent data structures by utilizing the first data structure;

wherein:
the pointers to the backup files of the first data structure prevent re-copying of unmodified data of the first data structure, the unmodified data having not been modified since the first data structure was generated.

15. The computer program product of claim 14, wherein the step of recording comprises:
performing an application specific write-suspend, a General Parallel File System (GPFS) write-suspend, recording a GPFS file system snapshot, recording a GPFS configuration, performing a GPFS specific write-resume, and performing an application specific write-resume.

16. The computer program product of claim 14, wherein the step of copying further comprises:
compressing a full backup copy of the set of data created at a first time that the step of copying is performed, and subsequently compressing an incremental backup copy of the data and the associated metadata.

17. The computer program product of claim 14, further comprising instructions to:
determine to perform a remote data protection process responsive to exceeding a maximum number of snapshots and an existence of a previously created snapshot.

18. The computer program product of claim 14, wherein the file system configuration information includes file system quotas, filesets, and access-control-lists.

* * * * *